United States Patent [19]

Kudinov et al.

[11] 4,021,688

[45] May 3, 1977

[54] PICKUP FOR MEASURING VIBRATION PARAMETERS OF OPERATING MACHINERY PARTS

[76] Inventors: Valentin Georgievich Kudinov, Leninsky prospekt, 69, kv. 49; Mikhail Dmitrievich Genkin, ulitsa Fersmana, 3, kv. 16, both of Moscow, U.S.S.R.

[22] Filed: Nov. 3, 1975

[21] Appl. No.: 628,424

Related U.S. Application Data

[63] Continuation of Ser. No. 533,495, Dec. 17, 1974, abandoned.

[30] Foreign Application Priority Data

Dec. 18, 1973 U.S.S.R. ............................ 1974106

[52] U.S. Cl. .................................. 310/8.7; 310/9.1
[51] Int. Cl.² ............................................ H01L 41/04
[58] Field of Search ............ 310/8.3, 8.4, 8.7, 9.1; 73/517 A, 517 R, 517 AV, 71.5 US; 279/32, 42, 48

[56] References Cited

UNITED STATES PATENTS

| | | | |
|---|---|---|---|
| 1,808,944 | 6/1931 | Brown | 279/32 X |
| 2,370,487 | 2/1945 | Poutie | 279/42 |
| 2,406,444 | 8/1946 | Stoner | 279/48 |
| 2,468,946 | 5/1949 | Sherman | 279/48 |
| 2,785,308 | 3/1957 | Stahl | 310/9.1 X |
| 2,913,935 | 11/1959 | Flannery et al. | 279/42 X |
| 2,917,642 | 12/1959 | Wright et al. | 310/9.1 X |
| 3,364,368 | 1/1968 | Sonderegger | 310/8.7 |
| 3,743,869 | 7/1973 | Hugli | 310/8.4 |

*Primary Examiner*—Mark O. Budd

[57] ABSTRACT

A pickup for measuring vibration parameters of operating machinery parts includes a housing shaped as a truncated cone and inserted into a collet having a conical internal surface which conjugates with the tapered surface of the housing, the outer surface of the collet being cylindrical and threaded. Built into the pickup housing is a sensitive element whose sensitive axis extends along the axis of rotation of the housing or is perpendicular to the axis of rotation.

4 Claims, 4 Drawing Figures

PICKUP FOR MEASURING VIBRATION PARAMETERS OF OPERATING MACHINERY PARTS

This is a continuation of application Ser. No. 533,495 filed Dec. 17, 1974, now abandoned.

BACKGROUND OF THE INVENTION

The present invention relates to devices for measuring vibratiion parameters and, more particularly, to pickups for measuring vibration parameters of operating machinery parts, including such parameters as impact pressures, accelerations, forces, impact loads, etc.

There is known a pickup for measuring vibration parameters of operating machinery parts, which is a signal-component piezopickup for measuring acceleration components of mechanical vibrations of an operating machine.

This known pickup comprises a housing shaped as a cylindrical body of revolution, with a sensitive piezoelement arranged inside the body, the sensitive axis of the sensitive element extending, as a rule, along the axis of the housing. The pickup housing is provided with a thread or a threaded pin hole to receive a pin, the pin hole and the pin being intended for mounting the pickup on a part being tested, which part has a corresponding threaded hole.

This only measures one acceleration component (longitudinal or transverse) at the place where it is mounted on a stationary element or part of an operating machine or mechanism. Mounting the known pickups on fast-rotating parts (parts rotating at a great rotation frequency) is extremely complicated since it involves modifying the part being investigated and removing some material to ensure the pickup mounting, which, in turn, alters inertia and rigidity characteristics of the part being investigated and unbalances rotating parts. Moreover, the attachment of the known pickup to fast-rotating parts and units is extremely unreliable, as the pickup is structurally unfit for being mounted on fast-rotating parts.

There are also known multicomponent piezoelectric pickups intended for simultaneously measuring several acceleration components at one point on a stationary part or unit of an operating machine or mechanism.

It is impossible to mount such pickups on fast-rotating parts due to the great size and weight of these pickups. Also, mounting of the pickup requires a flange and a number of screws to secure the pickup.

In addition, multicomponent piezolectric pickups are practically inapplicable for vibroacoustic investigation, for the method of dividing spatial vibrations of rotating parts requires successively taking off, at one point of a part being investigated, and, preferably, by one sensitive element, an electric signal which is proportional to either longitudinal or transverse torsional, or radial vibrations of the part under investigation.

SUMMARY OF THE INVENTION

It is an object of the present invention to provide a pickup for measuring vibration parameters of operating machinery parts whose design provides for reliably mounting the pickup on fast-rotating parts with a minimum of material being removed, and thus minimize alterations in the estimated inertia and rigidity characteristics and the residual unblance magnitude of parts being investigated.

It is another object of this invention to provide a pickup which is able to successively measure, at a preselected point in a fast-rotating part, several acceleration components by using one sensitive element of a single-component piezopickup.

The foregoing and other objects of the present invention are attained by providing a pickup for measuring vibration parameters of operating machinery components, having a housing shaped as a body of revolution and a sensitive element arranged inside the house wherein the housing is made, in accordance with the invention, as a truncated cone inserted in a collet having a conical internal surface conjugating with the conical surface of the housing, the outer surface of the collet being cylindrical and threaded.

If the sensitive element inside the housing is arranged so that its sensitive axis is generally perpendicular to the rotational axis of the housing, it is expedient that a cylidrical projection with a slot be provided on the external end-face surface of the housing to enable the housing to be turned about its rotational axis. It is also expedient in this case that a hole be provided in the bottom of the threaded collet, the diameter of the hole being larger than the diameter of the projection so as to ensure access to the slotted projection.

The foregoing pickup design enables mounting of the pickup on fast-rotating parts, which only requires a minimum-size hole with an internal thread. Thus, the weight of the material removed from the part being investigated is brought as close as possible to the weight of the pickup, which helps to retain the balancing, inertia and rigidity characteristics of the part under investigation.

The proposed pickup design ensures accurate orientation and reliable attachment of the pickup of fast-rotating parts. It should be noted that the reliability is improved with an increase in the centrifugal forces.

The arrangement of the sensitive element inside the housing so that its sensitive axis is approximately perpendicular to the axis of rotation of the housing, and the possibility of turning the housing about its axis of symmetry with subsequent orientation and reliable attachment thereof to the part being investigated make it possible, by using one sensitive element of a single-component pickup, to measure different vibration parameters at one point on a fast-rotating part, for, example, longitudinal and transverse (tangential) acceleration components.

BRIEF DESCRIPTION OF THE DRAWINGS

Other objects and advantages of the present invention will become more apparent from the following detailed description of preferred embodiments thereof to be read in conjunction with the accompanying drawings, wherein.

DETAILED DESCRIPTION OF THE PREFERRED EMBODIMENT

Figure 1:
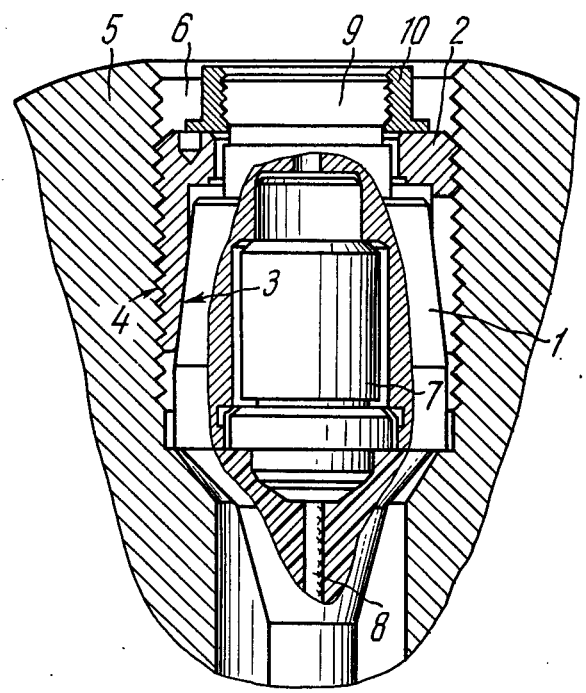
FIG. 1 is a longitudinal section of a pickup for measuring vibration parameters, mounted on a machine part, the sensitive axis of the sensitive element of the pickup extending along the rotational axis of the housing.

Referring now to the accompanying drawings, the proposed pickup for measuring vibration parameters of operating machinery parts (FIG. 1) comprises a housing 1 which is a body of revolution shaped as a truncated cone, the housing 1 being inserted into a collet 2 having an internal surface 3 which is conical and conjugates with the conical surface of the housing 1. An outer surface 4 of the collet 2 is cylindrical and threaded. With the aid of the threaded surface 4, the collet 2 is joined to a part 5 being investigated. To ensure the attachment of the collet 2 to the part 5, the latter is provided with a threaded hole 6.

Built into the housing 1 is a sensitive element 7 whose sensitive axis extends along the rotational axis of the housing 1. The sensitive element 7 is provided with a shielded current collector cable 8. The housing 1 has a cylindrical projection 9 having a threaded external surface mounted by a lock nut 10.

Figure 2:
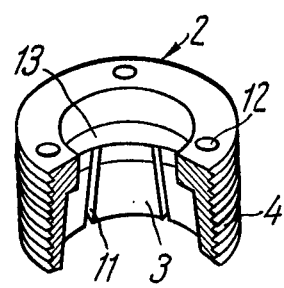
FIG. 2 is an isometric view of the collet.

The collet 2 (FIG. 2) is a cylinder-shaped body with the internal conical surface 3 and the threaded external surface 4. Spaced along the generatrix of the collet 2 are several (in the present embodiment, four) longitudinal through holes 11.

At the bottom of the collet 2 there are blind holes 12 for a wrench, and a central through hole 13 whose diameter is larger than the diameter of the projection 9.

Figure 3:
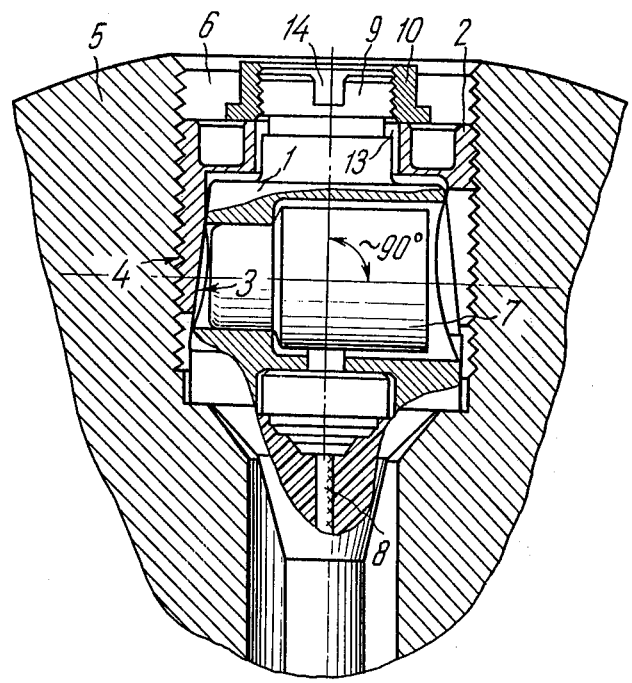
FIG. 3 is a schematic view of a pickup, wherein the sensitive axis of the sensitive element is perpendicular to the rotational axis of the pickup housing.

In the embodiment shown in FIG. 3, the sensitive element, in contrast to the the pickup shown in FIG. 1, is built into the housing 1 so that its sensitive axis is generally perpendicular to the rotational axis of the housing 1. In the cylindrical projection 9 of the housing 1, which projection extends through the hole 13 of the collet 2, there is a notch 14 for turning the housing 1 about its rotational axis.

Figure 4:
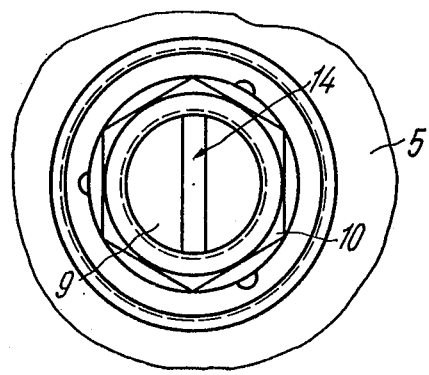
FIG. 4 is a plan view of the pickup shown in FIG. 3.

FIG. 4 is a top view of the pickup and the part shown in FIG. 3. The notch 14 can be turned by a screw driver. The function of te sensitive element 7 in the proposed pickup may be performed by piezoelectric sensitive elements, tensometric sensitive elements, sensitive elements of the diaphragm type, and tourmaline pressure gauges, whose designs are described in detail, for example, in the following publications:

1. Soviet Encyclopaedia, Enlarged Edition, vol. 13, p. 396, Pickups of the Second Group.
2. N. P. Payevsky, "Datchiki mechanicheskikh parametrov machin" ("Sensing Devices for Measuring Mechanical Parameters of Machines"), the Publishing House of the USSR Academy of Sciences, Moscow, 1959, pp. 18, 19.

The selection of a specific type of sensitive element is determined by the vibration parameter to be measured.

The structure of the pickup housing 1 enables the arranging of the sensitive element 7 therein so that the sensitive axis of the sensitive element 7 extends radially (FIG. 1), transversely and tangentially (FIG. 3) with respect to the rotational axis of the rotating part 5 being tested, which part 5 is provided with the threaded hole 6 for mounting the collet 2.

The pickup is mounted, oriented and secured in place as follows.

The sensitive element 7 is arranged tangentially or radially in the pickup housing 1 which is then inserted into the hole 6 provided in the part 5. The collet 2 is then screwed into the hole 6 with the aid of a torque wrench. If the sensitive element 7 (FIG. 3) is arranged tangentially, this operation is accompanied by turning and orienting the pickup housing 1 with respect to the rotational axis of the part 5. Finally, the lock nut 10 is screwed on.

In order to successively measure longitudinal and transverse (tangential) components of the parameter being tested at one point on the fast-rotating part under investigation with the aid of a tangential pickup, it is necessary to slightly unscrew the collet 2 with a wrench, to turn the pickup housing 1 through a required angle by using a screw driver inserted into the notch 14, and then repeat the fixing operations described hereinabove.

Measurements of radial components of a parameter being tested are taken with the aid of the pickup shown in FIG. 1.

Measurements of longitudinal and tangential components of a parameter being tested are taken with the aid of the pickup shown in FIG. 3.

It should be noted that, depending upon the type of sensitive element employed in the single-component pickup of the present invention, this pickup permits the performing of directional measurements at one point of a fast-rotating part of different physical characteristics and their parameters, including acceleration, impedance, pressure, etc.

What is claimed is:

1. A pickup for measuring vibration parameters of operating machinery parts, comprising: a housing shaped as a truncated cone; a collet into which the housing is inserted; the collet having a conical internal surface conjugated with the conical surface of the housing; the collet having a cylindrical threaded external surface; and a sensitive element built into the housing.

2. The pickup for measuring vibration parameters of operating machinery parts as claimed in claim 1, wherein the sensitive element is arranged so that its sensitive axis is generally perpendicular to a rotational axis of the housing; and further comprising: a cylindrical projection on the outer end face surface of the housing; a notch provided on the projection to turn the housing about its axis of rotation; and a hole in the bottom of the collet, the diameter of the hole being larger than the diameter of the projection, the hole being intended to provide access to the notched projection.

3. The pickup for measuring vibration parameters of operating machinery parts as claimed in claim 1, wherein the sensitive element is arranged so that its sensitive axis extends along a rotational axis of the housing; and further comprising: a cylindrical projection having a threaded external surface on the outer end face surface of the housing; a hole in the bottom of the collet, the diameter of the hole being larger than the diameter of the projection; and a lock nut adapted to be screwed on the threaded external surface of the cylindrical projection.

4. The pickup for measuring vibration parameters of operating machinery parts as claimed in claim 2, wherein the cylindrical projection has a threaded external surface; and further comprising a lock nut adapted to be screwed on the threaded external surface of the cylindrical projection.

* * * * *